United States Patent [19]

Ferguson et al.

[11] Patent Number: 5,022,370
[45] Date of Patent: Jun. 11, 1991

[54] IGNITION SYSTEM FOR MARINE PROPULSION DEVICE

[75] Inventors: Arthur R. Ferguson, Northbrook; David E. Rawlings, Palatine, both of Ill.

[73] Assignee: Outboard Marine Corporation, Waukegan, Ill.

[21] Appl. No.: 351,772

[22] Filed: May 15, 1989

[51] Int. Cl.⁵ .................. F02P 5/145; F02P 9/00; F02P 17/00

[52] U.S. Cl. .................... 123/425; 123/335; 123/418; 73/35; 74/851; 440/1

[58] Field of Search .......... 123/425, 418, 198 F, 123/335; 74/851, 852; 73/35, 117.3, 118.1; 440/1

[56] References Cited

U.S. PATENT DOCUMENTS

| | | | |
|---|---|---|---|
| 3,834,361 | 9/1974 | Keely | 123/479 |
| 3,948,228 | 4/1976 | Luchaco | 123/479 |
| 4,236,491 | 12/1980 | Hattori et al. | 123/425 |
| 4,245,591 | 1/1981 | Nishida et al. | 123/416 |
| 4,258,684 | 3/1981 | Schira | 123/418 |
| 4,262,622 | 4/1981 | Dretzka et al. | 74/851 |
| 4,274,381 | 6/1981 | Abo | 123/479 |
| 4,275,692 | 6/1981 | Takeda et al. | 123/419 |
| 4,290,301 | 9/1981 | Yamaguchi | 73/35 |
| 4,357,919 | 11/1982 | Hattori et al. | 123/425 |
| 4,377,997 | 3/1983 | Staerzl | 123/425 |
| 4,462,362 | 7/1984 | Bonitz et al. | 123/425 |
| 4,525,149 | 6/1985 | Broughton et al. | 74/851 |
| 4,558,673 | 12/1985 | Mackie | 123/335 |
| 4,726,798 | 2/1988 | Davis | 123/335 |
| 4,770,143 | 9/1988 | Takahashi | 123/425 |

FOREIGN PATENT DOCUMENTS 3128475 1/1983 Fed. Rep. of Germany ...... 123/425

*Primary Examiner*—Andrew M. Dolinar
*Attorney, Agent, or Firm*—Michael, Best & Friedrich

[57] ABSTRACT

A control system for an internal combustion engine, the control system receiving an input signal from an engine speed sensor, receiving an input signal from an engine knock sensor, advancing the spark timing of the internal combustion engine until a knock signal is received from the knock sensor, and, in response to receipt of a knock signal from the knock sensor, retarding the spark timing of the internal combustion engine until a knock signal is no longer received from the knock sensor and thereafter maintaining a substantially constant spark timing until the signal received from the engine speed sensor indicates a change in engine speed.

17 Claims, 2 Drawing Sheets

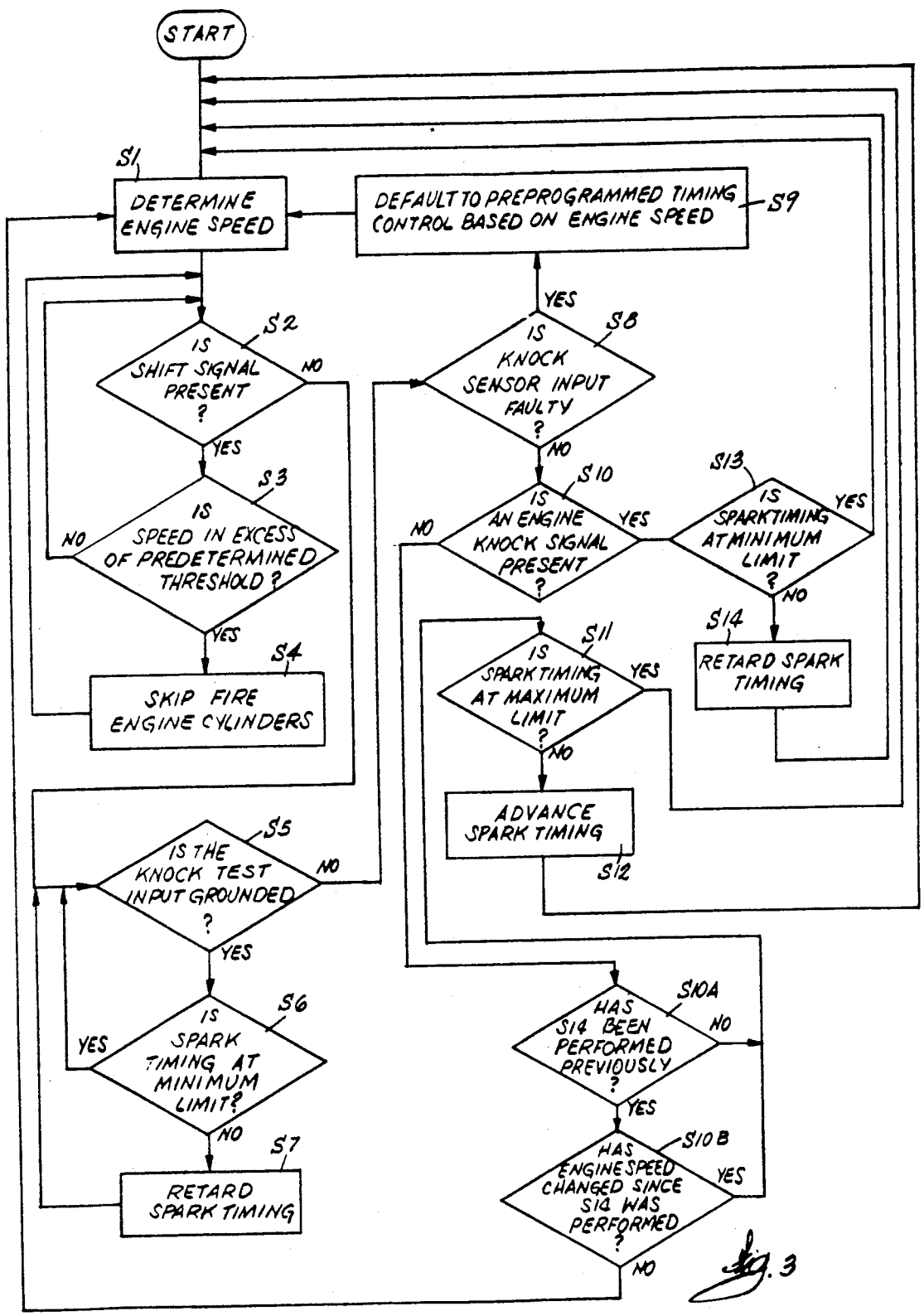

000
IGNITION SYSTEM FOR MARINE PROPULSION DEVICE

BACKGROUND OF THE INVENTION

The invention relates generally to ignition systems for internal combustion engines. More particularly, the invention relates to electronic ignition systems for marine propulsion devices.

Previously known electronic ignition systems for internal combustion engines generally receive a signal from an engine knock sensor and provide a signal for advancing or retarding engine spark timing in response to the signal received from the sensor. This procedure is performed in an attempt to operate the internal combustion engine at optimum efficiency. Some such ignition systems constantly adjust timing in an attempt to maintain, for a given speed, maximum timing advance without knock. A problem with such systems is that the internal combustion engine frequently encounters knock conditions, because the engine is continuously operated proximate the knock threshold.

The prior art also provides an internal combustion engine including an ignition system responsive to a knock sensor, wherein timing is greatly retarded in response to a fault of the knock sensor. See, for example, U.S. Pat. No. 4,621,602. A problem with this design is that, upon fault of the knock sensor, closed loop control of spark timing versus engine speed is completely abandoned in favor of large retardation, thereby resulting in poor fuel economy.

The prior art also provides marine propulsion devices including ignition interruption means for assisting transmission shifting. See, for example, Dretzka et al. U.S. Pat. No. 4,262,622. In these devices engine ignition is generally interrupted when a switch communicating with a shift lever detects movement of the lever, if sufficient shift resistance is encountered. A load sensing device senses shift resistance to movement of a clutch member into or out of engagement with a bevel gear of a transmission, and the engine ignition is interrupted, during shifting, if the shift resistance exceeds a predetermined value. A problem with such a design is that if an operator of the marine propulsion device is slow in actuating the shift lever, the engine ignition may be interrupted for a sufficiently long period that the engine may stall.

The prior art further provides ignition systems designed to skip firing of certain cylinders at certain engine speeds, for the purpose of fuel economy. However, these designs are not particularly addressed to the problem of assisting shifting. A problem may also arise, in skip firing designs, if the same cylinders are continually skipped, thereby creating a gas buildup, which could lead to a backfire condition.

SUMMARY OF THE INVENTION

The invention provides a control system for an internal combustion engine, the control system comprising means for receiving an input signal from an engine speed sensor, means for receiving an input signal from an engine knock sensor, means for advancing the spark timing of the internal combustion engine until a knock signal is received from the knock sensor, and means operable in response to receipt of a knock signal from the knock sensor for retarding the spark timing of the internal combustion engine until a knock signal is no longer received from the knock sensor and for thereafter maintaining a substantially constant spark timing until the signal received from the engine speed sensor indicates a change in engine speed.

The invention also provides a control system for an internal combustion engine, the control system comprising means for receiving an input signal from an engine speed sensor, means for receiving an input signal from an engine knock sensor, means for controlling the spark timing of the internal combustion engine in response to the input signal received from the engine speed sensor and the input signal received from the engine knock sensor, means for determining if the input signal from the engine knock sensor is faulty, and means for controlling the spark timing of the internal combustion engine in response to the input signal received from the engine speed sensor, exclusive of the input signal from the engine knock sensor, if the input signal received from the engine knock sensor is determined to be faulty.

The invention also provides a control system for an internal combustion engine, the control system comprising means for receiving an input signal from an engine knock sensor, means for adjusting engine spark timing in response to the input signal, and predefined, selectively engageable test means for simulating an engine knock condition regardless of the input signal from the engine knock sensor.

The invention also provides an electronic ignition system for an internal combustion engine, the ignition system comprising means for receiving an electronic shift signal from a shift lever adapted to selectively move the internal combustion engine into and out of a drive condition, and means for selectively skipping the firing of fewer than all of the engine cylinders, during a firing sequence, in response to the shift signal being received.

The invention also provides a marine propulsion device comprising an internal combustion engine including a plurality of cylinders adapted to be fired in a predetermined sequence, a propeller shaft, transmission means for selectively drivingly connecting and disconnecting the internal combustion engine and the propeller shaft, manually operable shift control means for actuating the transmission means, and including a lever movable between a first position associated with the engine being connected to the propeller shaft, and a second position associated with the engine being disconnected from the propeller shaft, the shift control means including switch means for generating an electronic shift signal in response to movement of the lever, means for sensing engine speed, means for sensing engine knock, means for selectively skipping the firing of engine cylinders, during a firing sequence, in response to the switch means generating the shift signal and the speed sensing means sensing speed in excess of a predetermined amount, control means operative in the absence of the shift signal and including means for advancing the timing of the engine until a knock condition is sensed by the knock sensor, means for retarding the timing of the engine until the knock sensor no longer senses a knock condition, and means for preventing the timing of the engine from being adjusted, after the timing has been retarded such that the knock sensor no longer senses a knock condition, until a change in engine speed is sensed by the engine speed sensor, the control means further including default means comprising memory means for storing a table of appropriate timing values for selected engine speeds and means for interpolating an appropriate timing value for an engine speed different from any of the selected engine speeds, the control means further including means for detecting a fault condition at the knock sensor, means for utilizing the default means, in response to detection of a fault by the fault detection means, for adjusting engine spark timing, in response to the speed sensor, regardless of the knock sensing means, and selectively engageable means for simulating a knock condition regardless of the knock sensing means.

The invention also provides an electronic ignition system for an internal combustion engine, the ignition system comprising means for receiving an input signal from an engine speed sensor, means for receiving an input signal from an engine knock sensor, means for providing a signal for advancing timing of the internal combustion engine until a knock signal is received from the knock sensor, means for providing a signal for retarding the spark timing of the internal combustion engine, in response to timing having been advanced so that a knock signal is received, until a knock signal is no longer received, means for preventing timing from being adjusted, after timing has been retarded until the knock signal is no longer received, until the signal received from the engine speed sensor indicates a change in engine speed.

The invention also provides a marine propulsion device comprising an internal combustion engine, means for sensing the speed of the engine, means for sensing a knock condition of the engine, means for advancing the spark timing of the engine until a knock condition is sensed by the knock sensor, and means for retarding the spark timing of the engine until the knock sensor no longer senses a knock condition, and for thereafter maintaining a substantially constant spark timing until a change in engine speed is sensed by the engine speed sensor.

The invention also provides a method of controlling ignition timing in an internal combustion engine, the method comprising the steps of advancing the spark timing of the internal combustion engine until a knock condition is sensed, retarding the spark timing of the internal combustion engine, in response to the sensing of a knock condition, until a knock condition is no longer sensed, and thereafter maintaining a substantially constant spark timing until the engine speed changes.

The invention also provides a method of controlling ignition timing in an internal combustion engine communicating with an engine speed sensor and an engine knock detector, the method comprising the steps of determining if the knock detector is operating improperly, and adjusting the spark timing of the engine in response to the engine speed sensor, regardless of the engine knock detector, if it is determined that the knock detector is operating improperly.

The invention also provides an electronic ignition system for an internal combustion engine, the ignition system comprising means for receiving an input signal from an engine speed sensor, means for receiving an input signal from an engine knock sensor, means for providing an electronic signal for controlling the spark timing of the internal combustion engine in response to the input signal received from the engine speed sensor and the input signal received from the engine knock sensor, means for determining if the input signal from the engine knock sensor is faulty, and means for providing an electronic signal for controlling the spark timing of the internal combustion engine in response to the input signal received from the engine speed sensor, exclusive of the input signal from the engine knock sensor, if the input signal received from the engine knock sensor is determined to be faulty.

The invention also provides a marine propulsion device comprising an internal combustion engine, an engine speed sensor, an engine knock sensor, means for adjusting the spark timing of the internal combustion engine, a microprocessor controlled, electronic ignition system communicating with the speed sensor, with the engine knock sensor, and with the adjusting means, the system including means for controlling the spark timing of the internal combustion engine in response to the engine speed sensor and the engine knock sensor, for determining if a fault condition exists at the knock sensor, and for controlling the spark timing of the internal combustion engine in closed loop control with the speed sensor, exclusive of the engine knock sensor, if the determining means determines that a fault condition exists at the knock sensor.

The invention also provides an electronic ignition system for an internal combustion engine, the ignition system comprising a first input means for receiving an input signal from an engine knock sensor, means for providing an electronic signal for adjusting engine spark timing in response to the input signal from the engine knock sensor, and a predefined, selectively engageable second input means, separate from the first input means, for simulating an engine knock condition regardless of the input signal from the engine knock sensor.

The invention also provides a marine propulsion device comprising an internal combustion engine, an engine knock sensor, and a microprocessor controlled, electronic ignition system including a first input receiving an input signal from the engine knock sensor, means for providing an electronic output signal for adjusting engine spark timing, a second input, separate from the first input, and means responsive to grounding of the second input for providing an electronic output signal for adjusting spark timing as if a knock condition were sensed by the knock sensor, regardless of the first input.

The invention also provides a marine propulsion device comprising an internal combustion engine including a plurality of cylinders adapted to be fired in a predetermined sequence, a housing which is adapted to be mounted on the transom of a boat and which rotatably supports a propeller shaft, transmission means for selectively drivingly connecting and disconnecting the internal combustion engine and the propeller shaft, manually operable shift control means for actuating the transmission means, the control means including a lever movable between a first position associated with connection of the engine to the propeller shaft, and a second position associated with disconnection of the engine from the propeller shaft, and switch means for generating an electronic shift signal in response to movement of the lever, and means for selectively skipping the firing of fewer than all of the cylinders, during a firing sequence, in response to generation of the shift signal by the switch means.

Other features and advantages of the invention will become apparent to those skilled in the art upon review of the following detailed description, claims and drawings.

BRIEF DESCRIPTION OF THE DRAWINGS

FIG. 3 is a flowchart representing the operation of the control system shown in FIG. 1.

Before at least one of the embodiment of the invention is explained in detail, it is to be understood that the invention is not limited in its application to details of construction and the arrangement of components set forth in the following description or illustrated in the various drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENT

Figure 1:
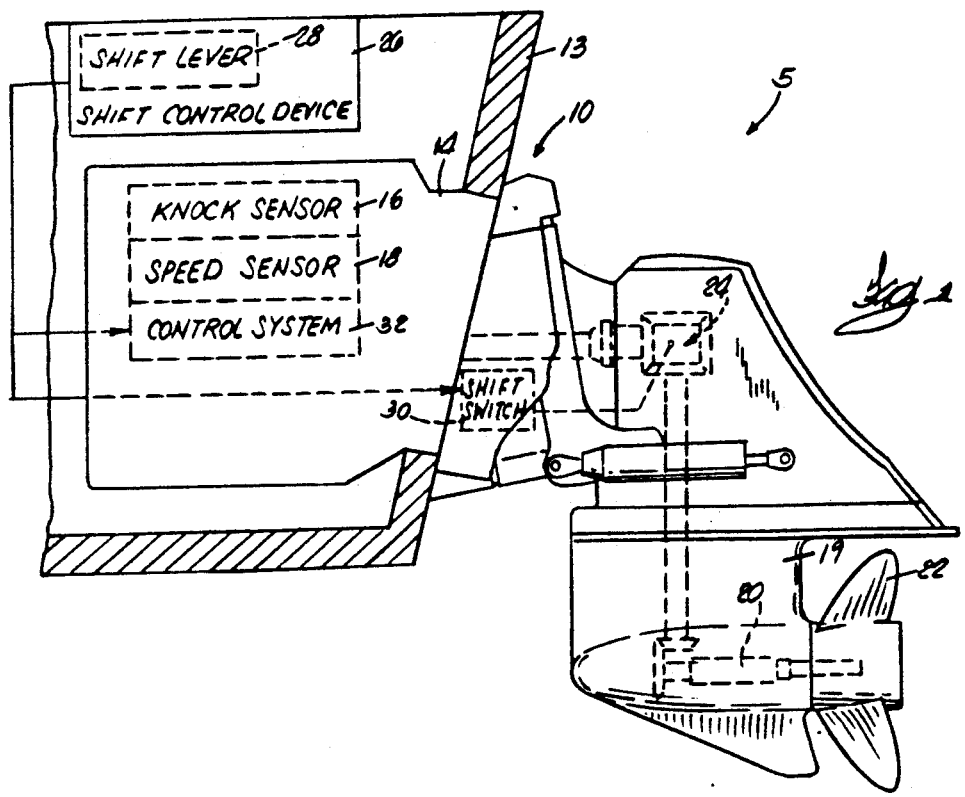
FIG. 1 is a side elevational view, partially in block diagram form, of a marine propulsion device incorporating various of the features of the invention.

Shown in FIG. 1 is marine installation 5 embodying the invention and including a marine propulsion device 10. Although the invention is illustrated in conjunction with a stern drive unit, the invention can be used in conjunction with outboard motors and other types of marine propulsion devices.

The marine propulsion device 10 comprises an internal combustion engine 14 including a plurality of cylinders adapted to be fired in a predetermined sequence. In the preferred embodiment, the engine 14 includes eight cylinders. The marine propulsion device 10 further comprises a knock sensor 16 communicating with the engine 14. The marine propulsion device 10 further comprises a speed sensor 18 communicating with the engine 14, for measuring the speed of rotation at the engine 14.

The marine propulsion device 10 further comprises a housing 19 mounted on the transom 13 of a boat, a propeller shaft 20 rotatably supported by the housing 19, and a propeller 22 mounted on the propeller shaft 20. The marine propulsion device 10 further comprises a transmission 24 for selectively drivingly connecting and disconnecting the engine 14 and the propeller shaft 20.

The marine installation 5 further includes a shift control device 26 for actuating the transmission 24. The shift control device 26 includes a shift lever 28 movable between a first position associated with connection of the engine 14 to the propeller shaft 20, and a second position associated with disconnection of the engine 14 from the propeller shaft 20. Preferably, the lever 28 is movable between a first or forward position, a second or neutral position, and a third or reverse position. The shift control device 26 further includes a shift switch 30 for generating an electronic shift signal in response to movement of the lever 28. An appropriate shift control device 26 is discussed in detail in U.S. pat. No. 4,432,734, which is incorporated herein by reference.

The marine propulsion device 10 further comprises a control system 32 which receives electronic input signals from the knock sensor 16, the speed sensor 18, and the shift switch 30. The control system 32 uses information received from the knock sensor 16, the speed sensor 18, and the shift switch 30 to control the engine 14 as will be discussed in further detail in conjunction with FIGS. 2 and 3.

Figure 2:
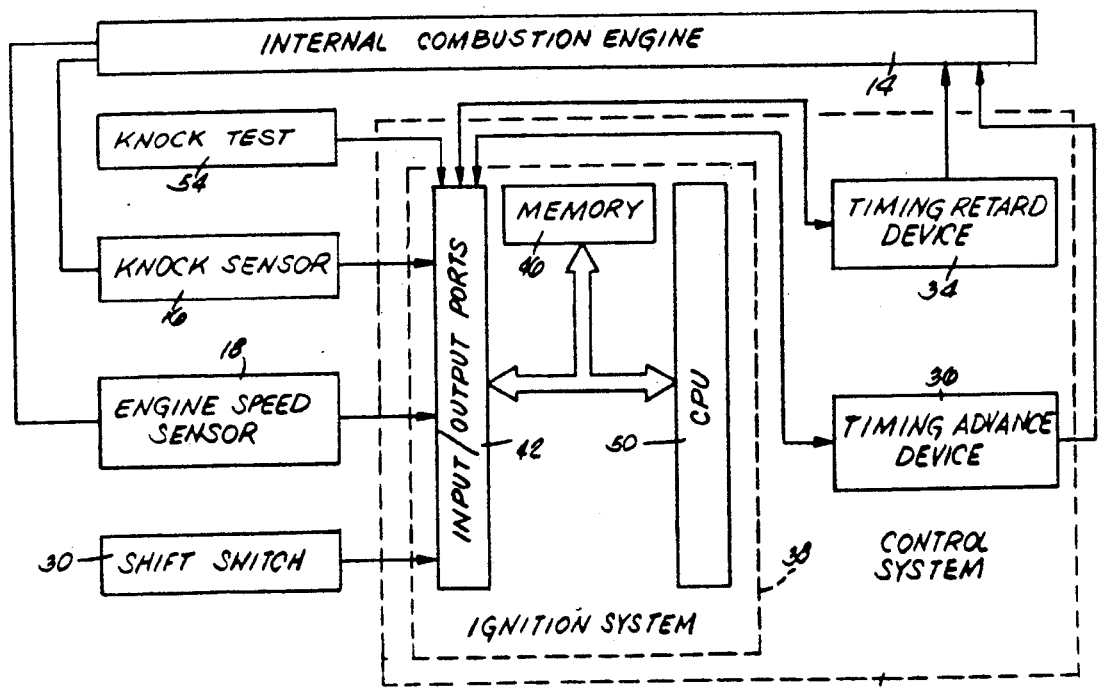
FIG. 2 is a block diagram setting forth in further detail the control system shown in FIG. 1.

Shown in FIG. 2 is the control system 32 in further detail. The control system 32 includes a timing retarder 34 for retarding the spark timing of the engine 14, and a timing advancer 36 for advancing the spark timing of the engine 14. In the preferred embodiment, the timing retarder 34 and the timing advancer 36 are part of a single ignition control which directly controls the firing of the cylinders of the internal combustion engine 14.

The control system 32 further includes an electronic ignition system 38 which receives electronic input signals from the knock sensor 16, the engine speed sensor 18, and the shift switch 30, and which provides an electronic signal for instructing the advancer 34 and the retarder 36 to adjust the spark timing of the engine 14.

In the illustrated embodiment, the ignition system 38 is controlled by a preprogrammed microprocessor that includes an input/output interface 42 communicating with the knock sensor 16, the speed sensor 18, the shift switch 30, the timing retarder 34, and the timing advancer 36. The microprocessor includes memory 46 and a central processing unit 50 that controls the input/output interface 42 and utilizes the memory 46 to carry out the functions shown in the flowchart of FIG. 3.

In the preferred embodiment, the control system 32 further includes, at the input/output interface 42 of the ignition system 38, a test input 54 for a factory test purpose that will later be described.

Shown in FIG. 3 is the logic followed by the control system 32, and more particularly, by the ignition system 38, which logic is preprogrammed into the microprocessor.

First, at step S1, the speed of the engine is determined by polling the input from the speed sensor 18. Next, at step S2, a query is made as to whether the above-described shift signal (which indicates shifting of the transmission) is being received from the shift switch 30. If the shift signal is being received, a determination is made at step S3 as to whether the speed sensed at step S1 has passed a predetermined threshold, i.e., whether the speed sensed at step S1 is in excess of a predetermined speed. In the preferred embodiment, this predetermined speed is 350 revolutions per minute. If the speed sensed at step S1 has not passed the predetermined threshold, or is not in excess of the predetermined amount, a return is made to step S2. It is to be understood that, in certain embodiments, the determination of step S3 may be skipped, or may be substituted with a determination of whether resistance to shifting is above a predetermined amount (such as described in U.S. Pat. No. 4,262,622, which is incorporated herein by reference).

If it is determined at step S3 that engine speed has passed the predetermined threshold, the control system 32 proceeds to step S4 where the firing of fewer than all of the engine cylinders is skipped during a firing sequence. In the preferred embodiment, in a loop comprising steps S2, S3 and S4, the cylinders that were skipped in the previous firing sequence are fired in the successive firing sequence. More particularly, in each sequence, the cylinders that were skipped in the previous firing sequence are fired, and the cylinders that were fired in the previous firing sequence are skipped. Still more particularly, half of the cylinders are fired during every other sequence, and the other half of the cylinders are fired during every other sequence. Thus, half of the cylinders are fired during each sequence.

In the preferred embodiment, the CpU 50 or the memory 46 includes a register for storing a firing sequence in binary form, the register including a plurality of bits. Each of the engine cylinders is represented by one of the bits, and bit value determines if the corresponding cylinder is skipped during a firing sequence. Each bit is complemented after each firing sequence. It is to be understood that if pairs of cylinders are fired simultaneously, one bit of the register may correspond to two cylinders of the engine. Alternatively, for example, if the ignition system 38 is used with a four-cylinder engine 14, and if the register includes eight bits, there may be bits that do not correspond to any of the cylinders of the engine 14.

Step S4 can be performed for any desired period of time, such as one engine revolution. After performing step S4, the control system 32 returns to step S2.

If at step S2 no shift signal is received from the shift switch 30, the control system 32 proceeds to step S5. At step S5, a determination is made as to whether an electronic test signal is being received from the test input 54. In the preferred embodiment, the electronic signal is received when the test input 54 is connected to ground. If the electronic signal is being received from the test input 54, a determination is made at step S6 as to whether spark timing is at its minimum limit. In the preferred embodiment, the minimum spark timing limit is 10 degrees BTDC. If spark timing is at the minimum limit, the control system 32 returns to step S5. If spark timing is not at the minimum limit, an electronic signal is provided, at step S7, instructing the timing retarder 34 to retard timing by the below-described predetermined retard amount. Step S7 can be performed for any desired period of time, such as one crank period (defined below). After performing step S7 the control system 32 returns to step S5. The loop comprising steps S5, S6, and S7 is repeated until timing is retarded to the minimum limit, or until the test signal is no longer received. This feature is provided so that operation of the control system 32 can be factory tested without the presence of a knock sensor.

If a test signal is not present at step S5, the control system 32 proceeds to step S8. At step S8, a determination is made as to whether the signal being received from the knock sensor 16 is faulty. This can be done, for example, by determining whether the signal from the knock sensor 16 is at the voltage of the electrical system of the marine propulsion device (usually 12 volts), or at zero volts, indicating that the knock sensor 16 has become electrically disconnected from the control system 32 or has become shorted to ground with respect to the electrical system of the marine propulsion device. If it is determined that the signal from the knock sensor 16 is faulty, the control system 32 controls the spark timing of the internal combustion engine, at step S9, regardless of the input signal from the knock sensor 16. More particularly, the control system 32 defaults to adjustment of the spark timing, in the loop comprising steps S1, S8, and S9, solely in response to, or in closed loop control with, the input signal from the engine speed sensor 18, without regard to the signal received from the knock sensor 16. Still more particularly, the memory 46 of the ignition system 38 stores a preprogrammed table of appropriate spark timing values for selected engine speeds, and the CpU 50, during step S9, uses logic to numerically interpolate an appropriate spark timing value for the engine speed sensed by the engine speed sensor 18. Of course, if the engine speed sensed by the engine speed sensor 18 is included in the table of selected values in the memory 46, the CpU 50 selects the appropriate timing value directly from the memory 46, without interpolation. The ignition system 38 then instructs the timing retarder 34 or the timing advancer 36 to adjust spark timing based on the appropriate timing value generated by the CpU 50 in response to the input signal from the engine speed sensor 18.

Step S9 can be performed for any desired period of time, such as one engine revolution. After performing step S9, the control system 32 returns to step S1.

If, at step S8, the control system 32 determines that the signal received from the knock sensor 16 is not faulty, the control system 32 proceeds to step S10. At step S10, a determination is made as to whether the signal being received from the knock sensor 16 indicates that a knock condition exists at or in the internal combustion engine 14. If it is determined at step S10 that a knock condition exists, the control system 32 proceeds to step S13 where a determination is made as to whether the spark timing is at the minimum limit. If it is determined at step S13 that spark timing is at the minimum limit, the control system returns to step S1. If it is determined at step S13 that spark timing is not at the minimum limit, the control system 32 proceeds to step S14 where the ignition system 38 instructs the timing retarder to retard timing by the previously mentioned predetermined retard amount. In the preferred embodiment, the predetermined retard amount is 0.78 degrees per crank period, i.e., 0.78 degrees per quarter revolution. (The "crank period" is the period between cylinder firings. In the preferred embodiment, wherein the eight cylinders are fired in pairs, there are four cylinder firings per revolution, so the crank period is ¼ of a revolution. If, for example, the engine had six cylinders fired in pairs, the crank period would be ⅓ of a revolution.)

The predetermined retard amount is significantly greater than the predetermined advance amount so that, after a knock condition has been sensed at step S10, timing is retarded sufficiently quickly that the engine 14 does not unduly operate in a knock condition, as do engines using prior art ignition systems which continuously search for an optimum timing for a given engine speed. In other words, the timing of the engine 14 is sufficiently retarded, after a knock signal is received at step S10, that knock will not likely again be encountered until engine speed changes. A timing retard amount of 0.78 degrees per crank period has been determined to provide an optimum balance of minimum knock and maximum engine efficiency. Until spark timing is retarded to the minimum limit, a loop comprising steps S10, S13, and S14 can be repeated until a knock signal is no longer received from the knock sensor 16.

If a knock signal indicating a knock condition is not being received at step S10, the control system 32 proceeds to step S10A where a determination is made as to whether step S14 has been previously performed. If it is determined at step S10A that step S14 has been previously performed, the control system 32 proceeds to step S10B, where a determination is made as to whether the engine speed has changed more than a predetermined amount since step S14 was performed. In the preferred embodiment, the predetermined amount is 50 rpm. If it is determined at step 10B that the engine speed has not changed more than 50 rpm (either up or down) since step S14 was last performed, the control system 32 returns to step S1. If it is determined at step S10B that the engine speed has changed more than 50 rpm since step S14 was performed, the control system 32 proceeds to step S11. If it is determined at step S10A that step S14 has not been previously performed, the control system 32 proceeds to step S11.

At step S11, a determination is made as to whether the spark timing is at its maximum limit. If it is determined at step S11 that spark timing is not at the maximum limit, the control system 32 proceeds to step S12 where the ignition system 38 instructs the timing advancer 36 to advance timing by a predetermined advance amount. In the preferred embodiment, the predetermined advance amount is 0.0078 degrees per crank period, i.e., 0.78 degrees per quarter revolution. Step S12 can be performed for any desired period of time, such as one crank period. After performing step S12, the control system 32 returns to step S1. A loop comprising steps S10, S10A, S10B, S11, and S12 is repeated until either (1) it is determined at step S10 that a knock condition exists or (2) it is determined at step S11 that spark timing is at the maximum limit. If it is determined at step S11 that spark timing is at the maximum limit, the control system returns to step S1.

When the transmission is not being shifted, the knock test input is not grounded and the knock sensor is operating properly, i.e., when the answers to the queries at steps S2, S5 and S8 are "no," the control system 32 operates as follows. Assuming "no" answers at steps S2, S5 and S8, the control system 32 proceeds from step S1 to step S10. If a knock condition is sensed at step S10, the control system 32 proceeds to step S13. If the spark timing is at its minimum limit, the control system proceeds from S13 to step S1. If the spark timing is not at its minimum limit, the control system 32 proceeds from step S13 to step S14. At step S14, the spark timing is retarded, for a predetermined period of time, as described above, and the control system 32 then proceeds to step S1. The control system then loops through steps S1, S10, S13, and S14 until either (1) a knock condition is no longer present at step S10 or (2) the spark timing reaches its minimum limit at step S13.

When a knock condition is no longer present at step S10, the control system 32 proceeds to step S10A. If step S14 has been previously performed, the control system 32 proceeds to step S10B. If the engine speed has changed more than 50 rpm since step S14 was performed, the control system 32 returns to step S1. If at step S10A it is determined that step S14 has not been previously performed, or if at step S10b it is determined that engine speed has changed more than 50 rpm since step S14 was performed, the control system 32 proceeds to step S11. Thus, since spark timing has been retarded so that a knock signal is no longer sensed at step S10, the control system 32 will loop through steps S1, S10, S10a and S10b until engine speed changes more than 50 rpm at step S10b, at which point the control system 32 proceeds to step S11.

If at step S11 it is determined that spark timing is not at its maximum limit, the control system 32 proceeds to step S12. At step S12, the spark timing is advanced, for a predetermined time period, as described above, after which the control system 32 proceeds to step S1. If at step S11 it is determined that the spark timing is not at its maximum limit, the control system proceeds to step S1.

Various of the features of the invention are set forth in the following claims.

We claim:

1. A control system for an internal combustion engine, said control system comprising means for receiving an input signal from an engine speed sensor, means for receiving an input signal from an engine knock sensor, means for advancing the spark timing of the internal combustion engine until a knock signal is received from the knock sensor, and means operative in response to receipt of a knock signal from the knock sensor for retarding the spark timing of the internal combustion engine until the spark timing reaches a value at which a knock signal is no longer received from the knock sensor and for thereafter maintaining the spark timing substantially at said value until the signal received from the engine speed sensor indicates a change in engine speed.

2. A control system in accordance with claim 1 wherein said advancing means advances timing in steps of a first predetermined amount, and wherein said retarding means retards timing in steps of a second predetermined amount which is greater than the first predetermined amount.

3. A control system in accordance with claim 1 wherein said advancing means advances timing in steps of approximately 0.0078 degrees per crank period, and wherein said retarding means retards timing in steps of approximately 0.78 degrees per crank period.

4. A control system in accordance with claim 1 and further comprising means operative in response to receipt of a faulty signal from the knock sensor for controlling the spark timing of the engine regardless of the input signal from the knock sensor.

5. A control system in accordance with claim 4 wherein said means operative in response to receipt of a faulty signal adjusts the spark timing solely in response to the input signal from the engine speed sensor.

6. A control system in accordance with claim 4 wherein said means operative in response to receipt of a faulty signal includes memory means for storing a table of appropriate spark timing values for selected engine speeds, and means for interpolating an appropriate spark advance value for an engine speed different from any of the selected engine speeds.

7. A control system in accordance with claim 4 and further comprising means for simulating a knock condition regardless of the input from the knock sensor.

8. A control system in accordance with claim 1 and further comprising means for simulating a knock condition regardless of the input from the knock sensor.

9. An electronic ignition system for an internal combustion engine having an even number of cylinders, said ignition system comprising means for receiving an electronic shift shift signal from a means for selectively moving the internal combustion engine into and out of a drive condition, means for receiving an electronic signal representative of engine speed, and means operative in response to receipt of the shift signal and operative only when the speed signal indicates a speed in excess of a predetermined threshold for selectively skipping, during a firing sequence, the firing of half of the engine cylinders, and for firing, in a successive firing sequence, cylinders that were skipped in the previous firing sequence.

10. An electronic ignition system in accordance with claim 9 wherein said skipping means includes register means including a plurality of bits for storing a firing sequence in binary form, wherein each of said cylinders is represented by one of said bits, wherein bit value determines if the corresponding cylinder is skipped during the firing sequence, and wherein each bit is complemented after each firing sequence.

11. A marine propulsion device comprising an internal combustion engine including a plurality of cylinders adapted to be fired in a predetermined sequence, a housing adapted to be mounted on the transom of a boat, a propeller shaft rotatably supported by said housing, transmission means for selectively drivingly connecting and disconnecting said internal combustion engine and said propeller shaft, switch means for generating an electronic shift signal in response to shifting of said transmission means, means for sensing engine speed, means for sensing engine knock, means operative in response to said shift signal and only when said speed sensing means senses speed in excess of a predetermined amount for selectively skipping, during a firing sequence, the firing of fewer than all of the engine cylinders, and control means operative in the absence of said shift signal, said control means including means for advancing the spark timing of said engine until a knock condition is sensed by said knock sensor, and means operative in response to the sensing of a knock condition for retarding the spark timing of said engine until the spark timing reaches a value at which said knock sensor no longer senses a knock condition and for thereafter maintaining the spark timing substantially at said value until a change in engine speed is sensed by said engine speed sensor, said control means further including default means comprising memory means for storing a table of appropriate timing values for selected engine speeds, and means for interpolating an appropriate timing value for an engine speed different from any of the selected engine speeds, said control means further including means for detecting a fault condition at said knock sensor, and means for utilizing said default means, in response to detection of a fault condition, for adjusting engine spark timing in response to said speed sensing means and regardless of said knock sensing means, and said control means further including selectively engageable means for simulating a knock condition regardless of said knock sensing means.

12. A control system for an internal combustion engine, said control system comprising means for receiving an input signal from an engine speed sensor, means for receiving an input signal from an engine knock sensor, means for controlling the spark timing of the internal combustion engine in response to the input signal from the engine speed sensor and the input signal from the engine knock sensor, means for determining if the input signal from the engine knock sensor is faulty, and means for controlling the spark timing of the internal combustion engine solely in response to the input signal from the engine speed sensor, exclusive of the input signal from the engine knock sensor, if the input signal from the engine knock sensor is determined to be faulty.

13. A control system in accordance with claim 12 wherein said last mentioned means includes default means comprising memory means for storing a table of predefined appropriate spark timing values for selected engine speeds, and means for interpolating an appropriate timing value for an engine speed different from any of the selected engine speeds and without regard to any engine parameter other than speed, and means for utilizing said default means to adjust engine spark timing in response to the input signal from the engine speed sensor and exclusive of the input signal from the knock sensor.

14. A control system in accordance with claim 12 and further comprising selectively engageable means, separate from said knock sensor signal receiving means, for receiving a test input and for simulating a knock condition in response to the test input, regardless of the input from the knock sensor.

15. A control system in accordance with claim 12 wherein said last mentioned means includes default means comprising memory means for storing a table of predefined appropriate spark timing values for selected engine speeds, and means for interpolating an appropriate timing value for an engine speed different from any of the selected engine speeds, and means for utilizing said default means to adjust engine spark timing in response to the input signal from the engine speed sensor and exclusive of the input signal from the knock sensor.

16. A control system in accordance with claim 12 and further comprising user controllable selectively engageable means, separate from said knock sensor signal receiving means, for receiving a test input and for simulating a knock condition in response to the test input, regardless of the input from the knock sensor.

17. An electronic ignition system for an internal combustion engine having an even number of cylinders, said ignition system comprising means for receiving an electronic shift signal from a means for selectively moving the internal combustion engine into and out of a drive condition, and means selectively skipping, during a firing sequence, the firing of fewer than all of the engine cylinders, said skipping means including register means including a plurality of bits for storing a firing sequence in binary form, each of said cylinders being represented by one of said bits, with bit value determining if the corresponding cylinder is skipped during the firing sequence, and each bit being complemented after each firing sequence, said skipping means, in a successive firing sequence, thereby firing cylinders that were skipped in the previous firing sequence, and said skipping means firing half of the cylinders in each firing sequence.

* * * * *